US012776945B1

(12) United States Patent
Ning et al.

(10) Patent No.: US 12,776,945 B1
(45) Date of Patent: Oct. 27, 2026

(54) AUTOMOTIVE NETWORK SWITCH WITH HARDWARE-IMPLEMENTED SAFETY MONITOR

(71) Applicant: Marvell Asia Pte Ltd, Singapore (SG)

(72) Inventors: Xiongzhi Ning, Karlsruhe (DE); Axel Fischer, Buehl (DE)

(73) Assignee: Infineon Technologies Americas Corp., El Segundo, CA (US)

(*) Notice: Subject to any disclaimer, the term of this patent is extended or adjusted under 35 U.S.C. 154(b) by 74 days.

(21) Appl. No.: 17/949,231

(22) Filed: Sep. 21, 2022

Related U.S. Application Data

(60) Provisional application No. 63/246,725, filed on Sep. 21, 2021.

(51) Int. Cl.
*H04L 41/0654* (2022.01)
*H04L 43/50* (2022.01)
*H04L 67/12* (2022.01)

(52) U.S. Cl.
CPC .......... *H04L 41/0654* (2013.01); *H04L 43/50* (2013.01); *H04L 67/12* (2013.01)

(58) Field of Classification Search
CPC ..... H04L 41/0654; H04L 43/50; H04L 67/12; H04L 67/01; H04L 67/125
See application file for complete search history.

(56) References Cited

U.S. PATENT DOCUMENTS 6,639,910 B1 * 10/2003 Provencher ............. H04L 69/18 370/254
6,886,107 B2 * 4/2005 Walsh ................. G06F 11/2028 714/4.12
6,950,968 B1 * 9/2005 Parolari ............. G06F 11/2294 714/716
8,630,187 B1 * 1/2014 Rodberg ................. H04L 49/10 714/36
10,771,316 B1 * 9/2020 Plenderleith ............ H04L 41/40
(Continued)

OTHER PUBLICATIONS

A. Kern, H. Zhang, T. Streichert and J. Teich, "Testing switched Ethernet networks in automotive embedded systems," 2011 6th IEEE International Symposium on Industrial and Embedded Systems, Vasteras, Sweden, 2011, pp. 150-155, doi: 10.1109/SIES.2011.5953657. (Year: 2011).*

(Continued)

*Primary Examiner* — Rachel J Hackenberg
(74) *Attorney, Agent, or Firm* — Meitar Patents Ltd.; Daniel Kligler

(57) ABSTRACT

A network switch includes a plurality of ports, packet processing circuitry, and a failure detector including a hardware-implemented state-machine. The ports are configured to receive and transmit packets over a network. The packet processing circuitry includes multiple electronic components, the packet processing circuitry configured to process the packets, the processing including transferring packet information over multiple paths between the electronic components. The state-machine is configured to transfer test data over the paths of the packet processing circuitry, to verify successful transfer of the test data, and to initiate a responsive action upon detecting a failure in transferring the test data over one or more of the paths.

23 Claims, 4 Drawing Sheets

(56) References Cited

U.S. PATENT DOCUMENTS

| | | | | |
|---|---|---|---|---|
| 2003/0179777 | A1* | 9/2003 | Denton | H04L 49/555 370/503 |
| 2006/0056303 | A1* | 3/2006 | Aggarwal | H04L 45/00 370/248 |
| 2006/0064755 | A1* | 3/2006 | Azadet | H04L 63/145 726/24 |
| 2006/0083172 | A1* | 4/2006 | Jordan | H04L 43/50 370/241 |
| 2010/0002588 | A1* | 1/2010 | Cantwell | H04L 43/50 370/241 |
| 2010/0027421 | A1 | 2/2010 | Goossens et al. | |
| 2011/0153546 | A1* | 6/2011 | Latta | G06N 5/00 706/54 |
| 2012/0051735 | A1* | 3/2012 | Achkir | H04L 43/50 398/16 |
| 2013/0031281 | A1* | 1/2013 | Feehrer | G06F 13/28 710/23 |
| 2016/0380865 | A1 | 12/2016 | Dubal et al. | |
| 2018/0097714 | A1* | 4/2018 | Dasu | H04L 67/1097 |
| 2019/0353696 | A1* | 11/2019 | Hsu | G01R 31/2834 |
| 2020/0169489 | A1* | 5/2020 | Kniplitsch | G01R 31/318597 |
| 2020/0406910 | A1 | 12/2020 | Ruan et al. | |
| 2022/0038393 | A1 | 2/2022 | Roy et al. | |
| 2022/0329332 | A1* | 10/2022 | Anurag | H04B 3/46 |

OTHER PUBLICATIONS

IEEE Std. 802.3ch-2020, "IEEE Standard for Ethernet, Amendment 8: Physical Layer Specifications and Management Parameters for 2.5 GB/s, 5 GB/s, and 10 GB/s Automotive Electrical Ethernet", pp. 1-207, year 2020.

IEEE Std. 802.3bw-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, year 2016.

IEEE Std. 802.3bp-2016, "IEEE Standard for Ethernet, Amendment 4: Physical Layer Specifications and Management Parameters for 1 GB/s Operation over a Single Twisted-Pair Copper Cable", pp. 1-211, year 2016.

IEEE Std. 802.3cg-2019, "IEEE Standard for Ethernet, Amendment 5: Physical Layers Specifications and Management Parameters for 10 Mb/s Operation and Associated Power Delivery over a Single Balanced Pair of Conductors", pp. 1-256, year 2020.

Inernational Application # PCT/IB2024/058352 Search Report dated Dec. 18, 2024.

* cited by examiner

116

AUTOMOTIVE NETWORK SWITCH WITH HARDWARE-IMPLEMENTED SAFETY MONITOR

CROSS-REFERENCE TO RELATED APPLICATIONS

This application claims the benefit of U.S. Provisional Patent Application 63/246,725, filed Sep. 21, 2021, whose disclosure is incorporated herein by reference.

FIELD OF THE DISCLOSURE

The present disclosure relates generally to network communication, and particularly to detection of failures in network devices.

BACKGROUND

Communication networks are sometimes used in mission-critical applications, and are therefore required to meet high standards of reliability. One typical example is an automotive network used for communication between sensors, Electronic Control Units (ECUs) and other units in a vehicle. Since network reliability in a vehicle is directly related to driver safety, components of automotive networks are required to be highly reliable. For example, network devices may be required to meet a specified Failure Tolerant Time Interval (FTTI)—A maximum time from occurrence of a fault until transition to a safe state.

The description above is presented as a general overview of related art in this field and should not be construed as an admission that any of the information it contains constitutes prior art against the present patent application.

SUMMARY

An embodiment that is described herein provides a network switch including a plurality of ports, packet processing circuitry, and a failure detector including a hardware-implemented state-machine. The ports are configured to receive and transmit packets over a network. The packet processing circuitry includes multiple electronic components, the packet processing circuitry configured to process the packets, the processing including transferring packet information over multiple paths between the electronic components. The state-machine is configured to transfer test data over the paths of the packet processing circuitry, to verify successful transfer of the test data, and to initiate a responsive action upon detecting a failure in transferring the test data over one or more of the paths.

In some embodiments, the failure detector further includes a hardware-implemented timer configured to invoke the state-machine periodically. In an embodiment, the state-machine includes one or more states configured to verify successful transfer of the test data over at least one of the paths, and the failure detector further includes a hardware-implemented timer configured to verify that the test data was transferred successfully within a defined time-out duration.

In example an embodiment, the electronic components include a host that runs software, and the state-machine is configured to verify successful transfer of the test data regardless of whether the software is functional or faulty. In a disclosed embodiment, the electronic components include a host, a switch Integrated Circuit (IC) and a peripheral bus connecting at least the host and the switch IC, and the state-machine includes one or more states configured to test at least one of the paths that traverse the peripheral bus between the host and the switch IC.

In an embodiment, at least one of the electronic components includes a register, and the state-machine includes one or more states configured to test at least one of the paths by writing a first value to the register, reading a second value from the register, and verifying that the second value equals the first value. In another embodiment, at least one of the electronic components includes a memory, and the state-machine includes one or more states configured to test at least one of the paths by writing a first pattern to the memory, reading a second pattern from the memory, and verifying that the second value equals the first value.

In yet another embodiment, at least one of the electronic components includes a memory, and the state-machine includes one or more states configured to test at least one of the paths by accessing the memory using Direct Memory Access (DMA). In still another embodiment, the electronic components include a host and an interrupt controller that issues interrupts to the host, and the state machine includes one or more states configured to test at least one of the paths that triggers the host using the interrupt controller.

In some embodiments, the failure detector is configured to transfer the test data, and detect the failure, during field operation of the network switch in the network.

There is additionally provided, in accordance with an embodiment that is described herein, a method for failure detection in a network switch including multiple electronic components. The method includes processing packets using the multiple electronic components of the network switch, the processing including transferring packet information over multiple paths between the electronic components. Using a failure detector comprising a hardware-implemented state-machine, test data is transferred over the paths of the packet processing circuitry, successful transfer of the test data is verified, and a responsive action is initiated upon detecting a failure in transferring the test data over one or more of the paths.

The present disclosure will be more fully understood from the following detailed description of the embodiments thereof, taken together with the drawings in which:

DETAILED DESCRIPTION OF EMBODIMENTS

Figure 1:
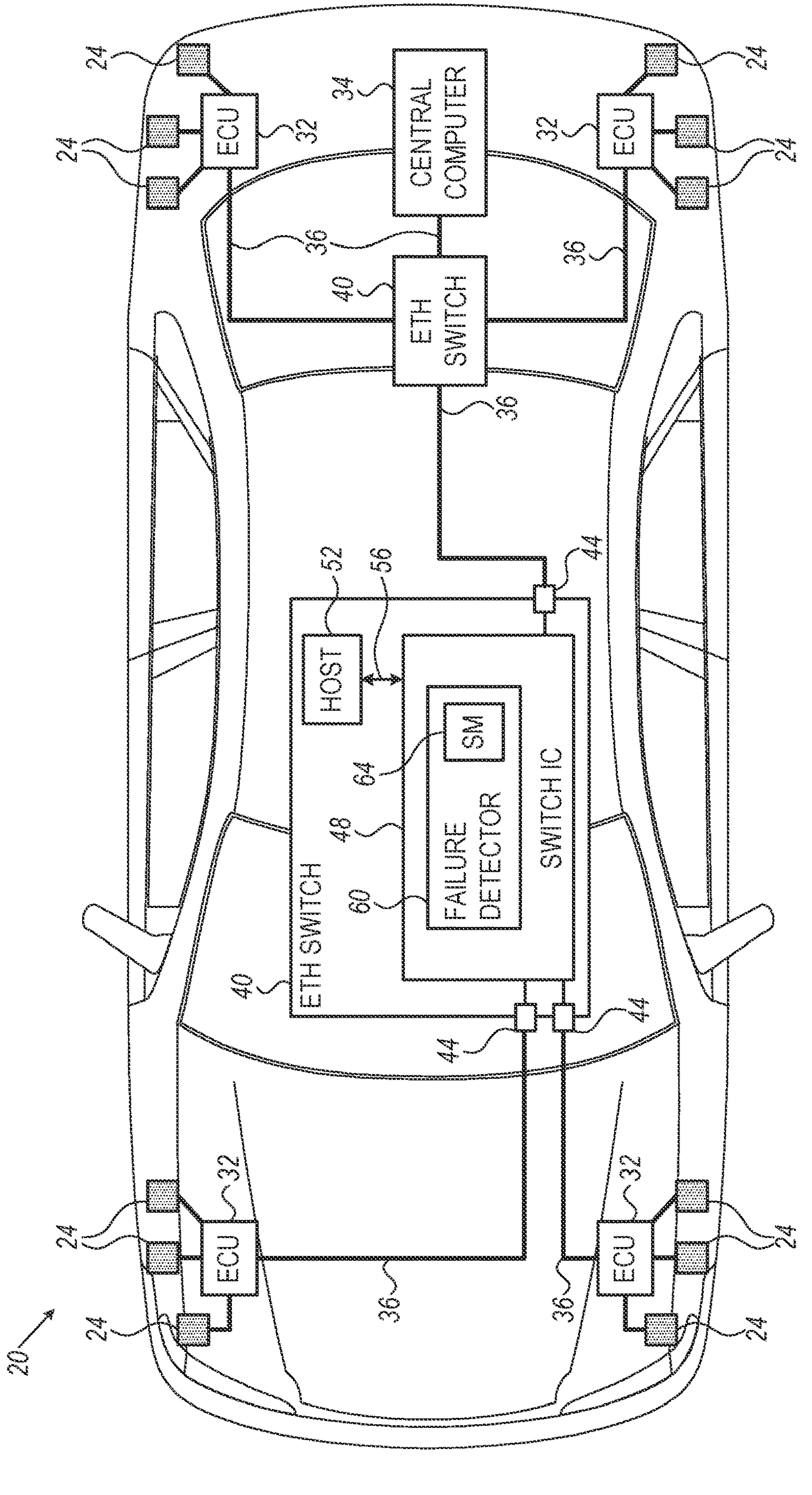
FIG. 1 is a block diagram that schematically illustrates an automotive computing and communication system, in accordance with an embodiment that is described herein.

Embodiments that are described herein provide improved techniques for failure detection in network devices. The embodiments described herein refer mainly to an Ethernet switch in an automotive network, by way of example. The disclosed techniques are, however, generally applicable in other suitable network devices and applications.

In some embodiments, a network switch comprises multiple ports and packet processing circuitry. The ports are connected to respective network links for receiving and transmitting packets. The packet processing circuitry comprises multiple electronic components configured to process the packets. In an example network switch, the electronic components comprise a switch Integrated Circuit (IC), a host processor that runs suitable software, a host memory, and a peripheral bus, e.g., a Peripheral Component Interconnect express (PCIe) bus.

Normal operation of such a switch involves transferring packet information (e.g., packet data, metadata and/or signaling such as interrupts relating to packets) over various paths between the electronic components. For example, a packet received via one of the ports may be written by the switch IC to the host memory using Direct Memory Access (DMA) over the PCIe bus. The packet may then be processed by the host processor, and then read by the switch IC using DMA and transmitted via another port. Other paths in the network switch may involve, for example, generation of interrupts, writing and reading of registers, and/or other suitable operations or interactions between the electronic components of the switch.

In an example embodiment, the switch is part of an automotive Ethernet network in a vehicle. To comply with safety requirements, the switch typically is required to (i) detect a failure within a specified time period (referred to as a Fault Detection Time Interval—FDTI), and (ii) react to the failure and reach a safe state within another specified time period. In some auotomotive applications, a fault is required to be handled within a time period referred to as Fault Handling Time Interval (FHTI), which consists of a Fault Detection Time Interval (FDTI) and a Fault Reaction Time Interval (FRTI). FHTI is typically required to smaller than a specified Fault Tolerant Time Interval (FTTI).

To address these requirements, in some embodiments the network switch further comprises a hardware-implemented failure detector that is capable of detecting failures in real-time, with small latency, high reliability and minimal degradation in communication performance of the switch. As such, the disclosed techniques are highly effective in reducing FDTI.

In some embodiments, the failure detector tests the various paths between the electronic components of the switch at regular intervals. The failure detector comprises a hardware-implemented state-machine that, when invoked, transfers test data over the various paths of the packet processing circuitry and verifies successful transfer of the test data. The state-machine additionally comprises one or more timers, which ensure that the various tests complete successfully within predefined timeout periods. The failure detector further comprises a hardware-implemented timer that invokes (triggers) the state-machine, e.g., periodically at regular intervals, during normal operation of the switch in the network.

In one example configuration, the state-machine is invoked to perform a full set of tests every ten milliseconds (10 ms). Each invocation (i.e., one instance of a full set of tests of the paths of the switch) is completed within several microseconds (μs). This regime enables fast detection of failures, and at the same time consumes only a small fraction of the switch resources. The disclosed failure detector typically operates, including transferring test data over the various paths and detecting failures, during field operation of the switch in the network. It is therefore important that the failure detector consume minimal switch resources, to minimize any effect on the switch's communication performance.

Example implementations of the state-machine, and of the failure detector as a whole, are described herein. As will be demonstrated, the disclosed failure detector covers the vast majority of paths in the switch, including both data-plane and control-plane paths, and tests both hardware and software elements. Since the state-machine is hardware-implemented, it continues operating and detecting failures (in hardware and/or in software) regardless of whether the software is functional or faulty. The disclosed techniques therefore considerably enhance failure detection and remediation capabilities in network devices. As such, the disclosed techniques significantly enhance the safety of automotive networks.

FIG. 1 is a block diagram that schematically illustrates an automotive computing and communication system 20, in accordance with an embodiment that is described herein. System 20 is installed in a vehicle, and comprises various sensors 24, multiple Electronics Control Units (ECUs) 32, and a central computer 34. It is noted that although the embodiments described herein refer mainly to automotive networks, the disclosed techniques can be used in network devices of other suitable networks.

Sensors 24 may comprise, for example, video cameras, velocity sensors, accelerometers, audio sensors, infra-red sensors, radar sensors, lidar sensors, ultrasonic sensors, rangefinders or other proximity sensors, or any other suitable sensor type. In the present example, each ECU 32 (sometimes referred to as a "zone ECU") is connected to the sensors installed in a respective zone of the vehicle. Each ECU 32 typically controls its respective sensors 24 and collects data from the sensors.

In some embodiments, the various components of system 20 are deployed at various different locations in the vehicle and communicate over a packet network installed in the vehicle. In the present example the packet network comprises an Ethernet network, but other suitable network protocols can also be used. The network comprises multiple Ethernet links 36, and one or more Ethernet switches 40. In various embodiments, the bit rate used in the network may be 10G bits per second (10 Gbps) in accordance with IEEE 802.3ch, 1000 Mbps in accordance with IEEE 802.3 bp, 100 Mbps in accordance with IEEE 802.3bw, 10 Mbps in accordance with IEEE 802.3cg (10Base-T1s), or any other suitable bit rate. Links 36 may comprise, for example, twisted-pair copper links or any other type of link suitable for Ethernet communication.

In the present non-limiting example, system 20 comprises two switches 40. The internal structure of one of switches 40 is shown in some detail in FIG. 1, and in greater detail in FIG. 2 below. Each switch 40 comprises multiple ports 44 for connecting to respective links 36, a switch IC 48, and a host 52. Host 52 and switch IC 48 communicate with one another over a peripheral bus 56, in the present example a PCIe bus. Switch IC 48 comprises a failure detector 60, which comprises a hardware-implemented state-machine (SM) 64. The operation of failure detector 60 is explained in detail below.

Failure detector 60 is also referred to (e.g., in U.S. Provisional Patent Application 63/246,725, cited above) as an Efficient Automatic Safety Monitor (EASM). The components of switch IC 48 (excluding failure detector 60), host 52 and PCIe bus 56 are also referred to jointly as "packet processing circuitry".

Figure 2:
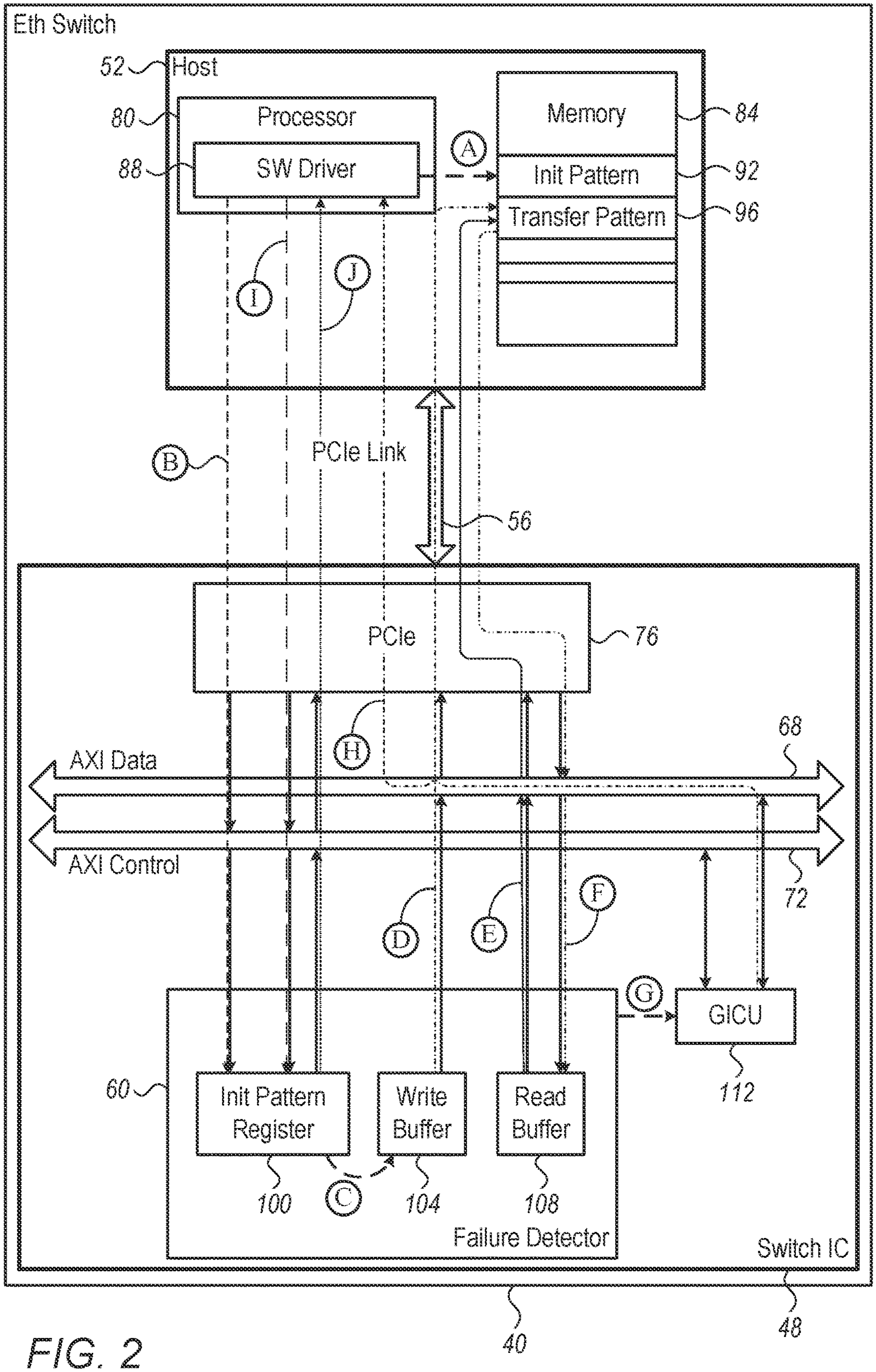
FIG. 2 is a block diagram that schematically illustrates a network switch in the system of FIG. 1, in accordance with an embodiment that is described herein.

FIG. 2 is a block diagram that schematically illustrates the internal structure of network switch 40, in accordance with an embodiment that is described herein. The figure shows the internal structure of switch IC 48 and host 52 in greater detail. In an embodiment, switch IC 48 and host 52 are implemented in separate Systems-on-Chip (SoCs) that are connected by PCIe link 56 (over a cable connection). In an alternative embodiment, the functions of host 52 can be carried out by an embedded CPU (not seen in the figure) that is part of switch IC 48. In this embodiment, PCIe link 56 is replaced by an internal connection bus, e.g. AXI.

In the present embodiment, host 52 comprises a host processor 80 and a host memory 84 (also referred to as "processor" and "memory" for brevity). Host processor 80 runs a software driver 88 that, among other tasks, communicates with switch IC 48 over PCIe link 56.

In an embodiment, switch IC 48 comprises a data bus 68 and a control bus 72, which connect the various components of the switch IC. In one embodiment, buses 68 and 72 comprise Advanced extensible Interface (AXI) buses. Alternatively, Compute Express Link (CXL) or any other suitable bus type can be used. Among other tasks, buses 68 and 72 are used for transferring data and control information, respectively, to and from ports 44 (ports 44 are seen in FIG. 1 above and have been omitted from FIG. 2 for clarity).

Switch IC 48 further comprises a PCIe controller 76, for communicating with host 52 over PCIe link 56. IC 48 also comprises a General Interrupt Controller Unit (GICU) 112 for generating interrupts such as Message Signaled Interrupts (MSI or MSI-X) that trigger host processor 80. Both PCIe controller 76 and GICU 112 are coupled to AXI buses 68 and 72.

In some embodiments switch IC 48 may additionally comprise components (not seen in the figure) such as an Embedded Processor Unit (EPU) and/or a Serial Peripheral Interface (SPI) controller. Such components typically communicate with the other switch components over data bus 68 and control bus 72.

For testing purposes, failure detector 60 comprises an initialization ("init") pattern register 100, a write buffer 104 and a read buffer 108. Register 100 is used for testing paths in which host processor 80 writes and/or reads registers in switch IC 48. Write buffer 104 is used for testing paths that involve data transfer from switch IC 48 to memory 84 (e.g., DMA write transactions). Read buffer 108 is used for testing paths that involve data transfer (e.g., DMA transfer) from memory 84 to switch IC 48 (e.g., DMA read transactions). Two memory regions are allocated in host memory 84 for supporting such tests—an init pattern region 92 and a transfer pattern region 96. The use of these elements by failure detector 60 will be described in detail below.

In some embodiments, multiple paths can be defined in switch 40. Each path is used for transferring packet information between electronic components of the switch. In the present context, the term "transferring packet information" is used in a broad sense to refer to any interaction between electronic components that pertains to packet processing. Transferring packet information may comprise, for example, writing packet data or metadata to a memory, reading packet data or metadata from a memory, transferring packet data or metadata over a bus, writing a value to a register, reading a value from a register, generating an interrupt that triggers a processor, etc.

In an embodiment, ten paths (denoted "A"–"J" in FIG. 2) are defined in switch 40, according to the following table:

| Path | Description |
|---|---|
| A | Software driver 88 sets-up desired memory regions in memory 84, to be later accessed by switch IC 48 using DMA. |
| B | Register write request: Software driver 88 issues a request to write to a register in switch IC 48, |
| C | Failure detector 60 copies the content of init pattern register 100 to write buffer 104. |
| D | Data transfer write request from switch IC 48 to memory 84 (e.g., a DMA write request). |
| E | Data transfer read request from switch IC 48 to memory 84 (e.g., a DMA read request). |
| F | Data transfer read completion : Read data transferred from memory 84 to switch IC 48, |
| G | A trigger from switch IC 48 to GICU 112, instructing GICU 112 to issue an interrupt (e.g., MSI or MSI-X). |
| H | An interrupt (e.g., MSI or MSI-X) from GICU 112 to host processor 80. |
| I | Register read request : Software driver 88 issues a request to read from a register in switch IC 48. |
| J | Register read completion: Register read value from switch IC 48 to host processor 80. |

Paths A-J cover the vast majority of the actual paths that can be used for actual packet processing in switch 40. As seen, paths A-J cover both hardware and software elements of the switch, including PCIe link 56. Moreover, paths A-J cover all PCIe protocol layers, all internal Random Access Memories (RAMs) used in PCIe and AXI bus bridges, AXI data bus 68, AXI control bus 72, GICU 112, and their respective interfaces.

As will be shown below, state-machine (SM) 64 of failure detector 60 tests the complete set of paths A-J. SM 64 comprises, inter alia, one or more states configured to test at least one of the paths that traverse the PCIe bus between host 52 and switch IC 48. SM 64 is therefore highly reliable in detecting failures in switch 40.

Figure 3:
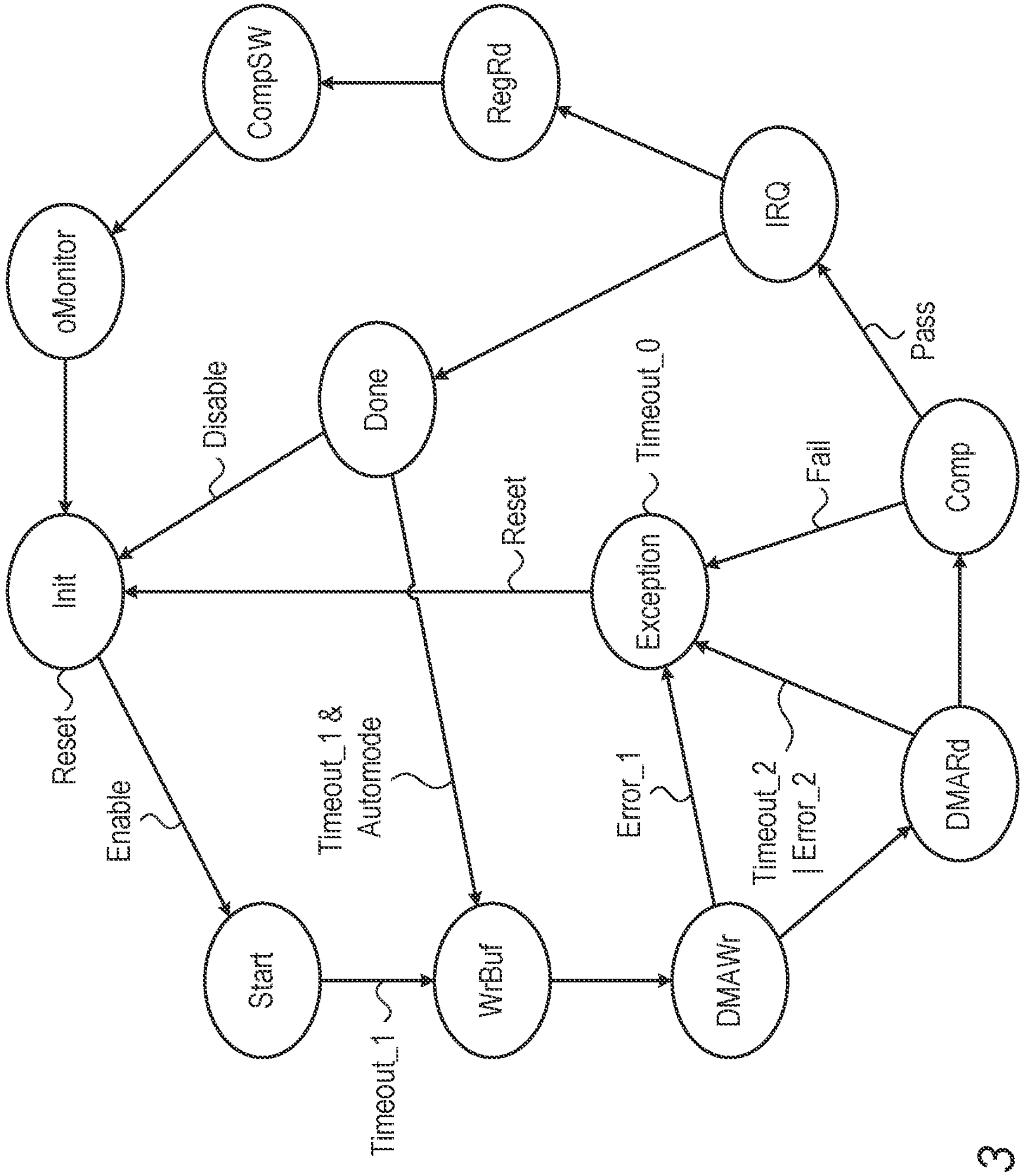
FIG. 3 is a state diagram that schematically illustrates operation of a state-machine in the network switch of FIGS. 1 and 2, in accordance with an embodiment that is described herein.

FIG. 3 is a state diagram 116 that schematically illustrates the operation of SM 64 of failure detector 60 in network switch 40, in accordance with an embodiment that is described herein. In the present example, SM 64 comprises a total of twelve states. The states, the paths they test and the transitions between states, in an example embodiment, are listed below:

Init: An initialization state. In this state, software driver 88 allocates two memory regions used as buffers in host memory 84 (path A)—Init pattern buffer 92 and transfer pattern buffer 96. The allocation typically remains unchanged during operation of failure detector 60. Given such a fixed allocation, DMA requests can be performed without a need for status updates or fetching of descriptors, thereby simplifying both hardware and software implementation. Software driver 88 creates an init pattern, stores the init pattern in init pattern buffer 92, and writes the init pattern to init pattern register 100 in switch IC 48 (path B). Software driver 88 writes the address of transfer pattern buffer 96 to a suitable internal memory in switch IC 48. Software driver 88 programs a timer register in failure detector 60 to set timers denoted Timer_1 and Timer_2 to respective timeout values denoted Timeout_1 and Timeout_2. Software driver 88 then starts SM 64.

Start: In this state, Timer_1 starts counting. When Timer_1 expires (counted a duration Timeout_1), SM 64 transitions to the next state-WrBuf.

WrBuf: In this state, SM 64 copies the init Pattern from init pattern register 100 to write buffer 104 (path C), and transitions to the next state-DMAWr.

DMAWr: In this state, SM 64 issues a DMA write that transfers the init pattern from write buffer 104 to transfer pattern buffer 96. The DMA write is performed in host memory 84, over AXI data bus 68, PCIe controller 76 and PCIe link 56 (path D). After successful completion of the DMA write, SM 64 transitions to the next state-DMARd. If an error occurs, SM 64 transitions to a state denoted "Exception".

DMARd: In this state, Timer_2 starts counting. SM 64 issues a DMA read that fetches the init pattern from transfer pattern buffer 96 in host memory 84 to read buffer in switch IC 48 (path E). After successful completion of the DMA read (path F), SM transitions to the next state-Comp. If an error occurs, or if Timer_2 expires (counts to Timeout_2) before failure detector 60 has received a DMA read response, SM 64 transitions to the Exception state.

Comp: In this state, SM 64 compares the patterns in write buffer 104 and read buffer 108. This test verifies that the previous data transfers (DMA write and DMA read) were correct. If the patterns are identical, SM 64 transitions to the next state-IRQ. Otherwise, SM 64 transitions to the Exception state.

IRQ: In this state, failure detector 60 signals an interrupt to GICU 112 (path G), causing the GICU to generate an interrupt request message (e.g., MSI or MSI-X message) to software driver 88 (path H). After sending the interrupt message, SM 64 transitions to the next state-Done.

Done: In this state, Timer_1 starts counting. When an automatic mode ("Automode"-A mode in which SM 64 is invoked periodically by a timer without software involvement) is enabled and Timer_1 has expired (Timeout_1), SM 64 transitions to the WrBuf state in order to repeat the above-described sequence of state transitions. Otherwise, SM 64 is transitioned to the Init state by software driver 88.

Exception: When an error occurs or a timer expires, SM 64 will remain in this state and trigger an exception interrupt to GICU 112. SM 64 will transition to the Init state after software driver 88 resets failure detector 60.

RegRd: This state is under software control. When software driver 88 is triggered by the above interrupt (the interrupt issued in the IRQ state), the software driver initiates a register read access (path I) to init pattern register 100, and fetches the register value back to the software driver.

CompSW: This state is under software control. When software driver 88 receives the pattern from init pattern register 100, the software driver compares the received pattern with the init pattern stored in memory 84 (in buffer 92). In this manner, the register write path (path B), register read path (path I) and register read response path (path J) are tested.

oMonitor: This state is under software control. In this state, software driver 88 can start other safety monitors, e.g., register access to other hardware modules. This state enables integration of other safety monitors into the failure detection process.

In an example implementation, software driver 88 initializes Timer 1 to 100 ms, i.e., SM 64 is invoked ten times per second, and the length of the init pattern is sixteen bytes. In this example, the testing process consumes a bandwidth of ~20 Kbps on PCIe link 56. This bandwidth is negligible relative to the total PCIe link bandwidth. In PCIe Gen3, for example, the total bandwidth is 8 Gbps.

In the embodiment of FIG. 3, failure detector 60 comprises an additional timer, denoted Timer_0, which governs the operation of SM 64 as a whole. Timer_0 is implemented in software in host 52, and is initialized and started upon receiving an IRQ from failure detector 60. Timer_0 is initialized to a value that exceeds the longest expected duration of a full iteration of SM 64. An example suitable value is twice the sum of Timer_1 and Timer_2. Such a large value ensures that expiry of the timer indicates an unexpected exception case.

As noted above, in the present embodiment SM 64 supports an automatic mode ("Automode") that can be enabled or disabled by software driver 88. Automode enables fully automated operation without any software involvement, but at the expense of omitting one or more paths from testing. With Automode disabled testing is more comprehensive, but does require some software involvement.

The SM configuration of FIG. 3 is an example configuration that is presented solely for the sake of conceptual clarity. In alternative embodiments, any other suitable SM configuration can be used. For example, the DMA write, DMA read and comparison operations (DMAWr, DMARd and Comp states) may be repeated twice or more, with different data patterns, before transitioning to the IRQ state. In an example implementation, the sequence DMAWr→DMARd→Comp is repeated twice, first with a certain patterns and then with an inverse of the pattern.

In some embodiments, switch 40 is implemented using multiple PCIe functions, and the same failure detector 60 is shared by the multiple PCIe functions. In such embodiments, software driver 88 typically configures SM 64 to test the various PCIe functions in alternation, one after the other. Re-configuration for the next PCIe function is typically performed when testing of the previous PCIe function has completed, e.g., in the Done or Init state.

In some embodiments, failure detector 60 can also be used for testing the Embedded Processor Unit (EPU) of switch 40, in addition to testing the PCIe-related components. In such an embodiment, a handover process is typically defined between software driver 88 (in host 52) and the EPU firmware (in switch IC 48). In this manner, failure detector 60 can monitor the various application paths related to both the EPU and the FW.

As a result of its periodic operation, SM 64 triggers GICU 112 to generate periodic interrupts to host processor 80. In some embodiments, software driver 88 can use these periodic interrupts for checking the status of any suitable path. The periodic interrupts originating from failure detector 60 obviate the need for implementing periodic software triggers, thereby simplifying software implementation and reducing resource loading in the host. The periodic interrupts can be used by software driver 88 for triggering other suitable safety monitors, general-purpose "watchdog" mechanism for verifying proper functioning of any desired hardware or software element.

Figure 4:
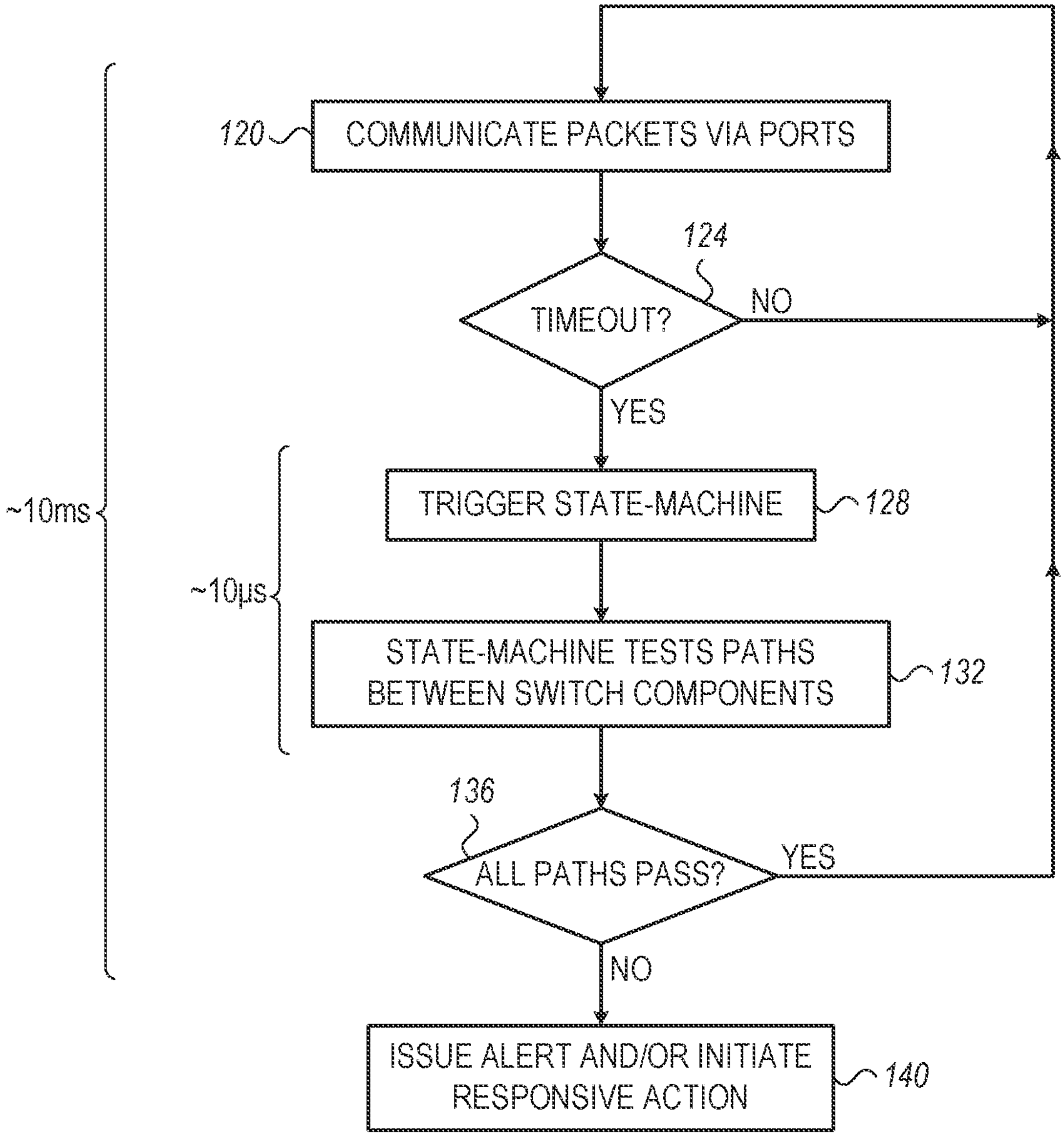
FIG. 4 is a flow chart that schematically illustrates a method for failure detection in the network switch of FIGS. 1 and 2, in accordance with an embodiment that is described herein.

FIG. 4 is a flow chart that schematically illustrates a method for failure detection in network switch 40, in accordance with an embodiment that is described herein. The method of FIG. 4 begins with the packet processing circuitry of switch 40 transmitting and receiving packets via ports 44, at a communication stage 120.

At a timeout checking stage 124, failure detector 60 checks whether a predefined timeout (e.g., 10 ms) has expired, at a timeout checking stage 124. If the timeout has not expired, the method loops back to stage 120. Upon expiry of the timeout, failure detector 60 triggers SM 64, at a state-machine triggering stage 128. SM 64 tests the various paths between the components of switch 40 as described above, at a testing stage 132.

At a pass/fail checking stage 136, failure detector 60 the test checks whether all passed successfully. With reference to FIG. 3 above, transitioning to the Done or Init state indicates success of all tests, whereas transitioning to the Exception state indicates failure of at least one test.

If all tests have passed, the method loops back to stage 120 above (after re-initializing the timeout). Otherwise, i.e., if failure is detected in at least one path, failure detector 60 issues an alert and/or initiates a suitable responsive action, at a responding stage 140.

In the present example, the duration of the testing stage is on the order of 10 μs, i.e., three orders of magnitude below the time period between invocations of the SM (10 ms). As such, the testing process incurs negligible overhead on the switch resources (e.g., traffic bandwidth, bandwidth over the PCIe link, etc.). At the same time, failures can be detected and acted upon with a fast response time of ~10 ms.

The configuration of system 20 and its components, such the internal structure of switch 40, and the configurations of failure detector 60 and state-machine 64, as shown in FIGS. 1-3, are example configurations that are depicted solely for the sake of clarity. In alternative embodiments, any other suitable configurations can be used.

The different components of switch 40, including failure detector 60 and state-machine 64, may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of switch 40, e.g., functions of host processor 80, may be implemented in software and/or using a combination of hardware and software elements. Elements that are not mandatory for understanding of the disclosed techniques have been omitted from the figure for the sake of clarity.

Although the embodiments described herein mainly address failure detection in network devices of automotive networks, the methods and systems described herein can also be used in other applications, such as in other safety-critical systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network switch, comprising:

a plurality of ports configured to receive and transmit packets over a network;

multiple electronic components configured to process the packets in the network switch, including a host processor and a host memory;

links connecting between the multiple electronic components of the network switch; and a failure detector, separate from the host processor, comprising:

a hardware-implemented state-machine having multiple states, configured to initiate transfer of test data over multiple paths passing over the links between the multiple electronic components of the network switch, to verify successful transfer of the test data, and to initiate a responsive action upon detecting a failure in transferring the test data; and a hardware-implemented timer configured to invoke the state-machine periodically, wherein the multiple paths include a path that transmits an interrupt from the hardware-implemented state-machine to the host processor, wherein the interrupt causes a software driver on the host processor to transfer data over one or more of the links.

2. The network switch according to claim 1, wherein the failure detector is configured to verify that the test data was transferred successfully within a defined time-out duration.

3. The network switch according to claim 1, wherein the host processor runs software, and wherein the state-machine is configured to verify successful transfer of the test data regardless of whether the software is functional or faulty.

4. The network switch according to claim 1, wherein the electronic components further comprise a switch Integrated Circuit (IC), the links comprise a peripheral bus connecting at least the host processor and the switch IC, and wherein the state-machine comprises one or more states configured to write test data to the host memory over the peripheral bus, read the written test data from the host memory over the peripheral bus and verify that the written test data matches the read data.

5. The network switch according to claim 1, wherein at least one of the electronic components comprises a register, and wherein the state-machine comprises one or more states configured to test at least one of the multiple paths by writing a first value to the register, reading a second value from the register, and verifying that the second value equals the first value.

6. The network switch according to claim 1, wherein the state-machine comprises one or more states configured to test at least one of the multiple paths by writing a first pattern to the host memory, reading a second pattern from the host memory, and verifying that the second value equals the first value.

7. The network switch according to claim 1, wherein the state-machine comprises one or more states configured to test at least one of the multiple paths by accessing the host memory using Direct Memory Access (DMA).

8. The network switch according to claim 1, wherein the electronic components comprise an interrupt controller that issues interrupts to the host processor, and wherein the state machine comprises one or more states configured to test at least one of the multiple paths that triggers the host processor using the interrupt controller.

9. The network switch according to claim 1, wherein the hardware-implemented timer is configured to periodically invoke the state-machine, during normal field operation of the network switch in the network.

10. The network switch according to claim 8, wherein the links comprise a peripheral bus, and the host processor is configured to read a value from a register in the failure detector and compare the read value to an initial pattern, responsive to the interrupt triggered by the state machine.

11. The network switch according to claim 1, wherein the interrupt causes the host processor to run a safety monitor software driver and wherein the software driver checks one or more of the multiple paths.

12. The network switch according to claim 1, wherein in each invocation of the hardware-implemented state-machine, the hardware-implemented state-machine transfers the test data from the failure detector to the host memory, and the software driver reads the test data from the failure detector.

13. The network switch according to claim 12, wherein the hardware-implemented timer is configured to periodically invoke the state-machine, during normal field operation of the network switch in the network.

14. A method for failure detection in a network switch including multiple electronic components, including a host processor and a host memory, the method comprising:

processing packets using the multiple electronic components of the network switch, the processing including transferring packet information over links connecting the multiple electronic components of the network switch; and periodically invoking a failure detector, separate from the host processor, wherein the failure detector comprises a hardware-implemented state-machine having multiple states, the state-machine initiates transfer of test data over multiple paths passing over the links between the multiple electronic components, verifies successful transfer of the test data, and initiates a responsive action upon detecting a failure in transferring the test data, wherein the multiple paths include a path that transmits an interrupt from the hardware-implemented state-machine to the host processor, wherein the interrupt causes a software driver on the host processor to transfer data over one or more of the links.

15. The method according to claim 14, wherein invoking the state-machine periodically is performed using a hardware-implemented timer.

16. The method according to claim 14, further comprising verifying, using a hardware-implemented timer, that the test data was transferred successfully within a defined time-out duration.

17. The method according to claim 14, wherein the host processor runs software, and wherein verifying the successful transfer of the test data is performed regardless of whether the software is functional or faulty.

18. The method according to claim 14, wherein the electronic components comprise a switch Integrated Circuit (IC), the links comprise a peripheral bus connecting at least the host memory and the switch IC, and the data-plane path includes the peripheral bus, and wherein transferring the test data and verifying the successful transfer comprises writing test data to the host memory over the peripheral bus, reading the written test data from the host memory over the peripheral bus and verifying that the written test data matches the read data.

19. The method according to claim 14, wherein at least one of the electronic components comprises a register, and wherein transferring the test data and verifying the successful transfer comprises testing at least one of the multiple paths by writing a first value to the register, reading a second value from the register, and verifying that the second value equals the first value.

20. The method according to claim 14, wherein at least one of the electronic components comprises a memory, and wherein transferring the test data and verifying the successful transfer comprises testing at least one of the multiple paths by writing a first pattern to the memory, reading a second pattern from the memory, and verifying that the second value equals the first value.

21. The method according to claim 14, wherein at least one of the electronic components comprises a memory, and wherein transferring the test data and verifying the successful transfer comprises testing at least one of the multiple paths by accessing the memory using Direct Memory Access (DMA).

22. The method according to claim 14, wherein the electronic components comprise an interrupt controller that issues interrupts to the host processor, and wherein transferring the test data and verifying the successful transfer comprises testing at least one of the multiple paths that triggers the host processor using the interrupt controller.

23. The method according to claim 15, wherein invoking the state-machine periodically using a hardware-implemented timer is performed during field operation of the network switch in the network.

* * * * *